(12) United States Patent
Newberry et al.

(10) Patent No.: US 8,931,172 B2
(45) Date of Patent: Jan. 13, 2015

(54) BODY HANGER KIT BRACKET

(71) Applicants: Bradley Charles Newberry, Huntsville (CA); Christopher Wade Campbell, Vineland (CA)

(72) Inventors: Bradley Charles Newberry, Huntsville (CA); Christopher Wade Campbell, Vineland (CA)

(73) Assignee: Tiercon Corp, Toronto, Ontario (CA)

( * ) Notice: Subject to any disclaimer, the term of this patent is extended or adjusted under 35 U.S.C. 154(b) by 0 days.

(21) Appl. No.: 14/132,892

(22) Filed: Dec. 18, 2013

(65) Prior Publication Data

US 2014/0101917 A1  Apr. 17, 2014

Related U.S. Application Data

(62) Division of application No. 13/205,215, filed on Aug. 8, 2011, now Pat. No. 8,635,776.

(60) Provisional application No. 61/503,863, filed on Jul. 1, 2011.

(51) Int. Cl.
*B21D 53/88* (2006.01)
*B23P 19/04* (2006.01)
*B62D 65/16* (2006.01)

(52) U.S. Cl.
CPC ............... *B23P 19/04* (2013.01); *B62D 65/16* (2013.01)
USPC .............. 29/897.2; 29/897; 29/897.1; 296/74

(58) Field of Classification Search
USPC .......... 29/897, 897.2, 897.1; 296/70, 74, 191, 296/209, 93.02
See application file for complete search history.

(56) References Cited

U.S. PATENT DOCUMENTS

| | | | |
|---|---|---|---|
| 2,352,420 A | 6/1944 | Wohlfield | |
| 2,997,329 A * | 8/1961 | Chapman | 296/191 |
| 3,580,628 A | 5/1971 | Rantala | |
| 4,784,430 A | 11/1988 | Biermacher | |
| 5,086,603 A | 2/1992 | Graf et al. | |
| 5,783,020 A | 7/1998 | Kress | |
| 6,139,089 A | 10/2000 | Troyer | |
| 6,722,730 B2 | 4/2004 | Lydan et al. | |
| 7,144,075 B2 | 12/2006 | Shishikura | |
| 7,665,795 B2 | 2/2010 | Shishikura | |
| 7,854,101 B2 | 12/2010 | Swayne et al. | |
| 2011/0133514 A1 | 6/2011 | Erb et al. | |

* cited by examiner

*Primary Examiner* — Richard Chang
(74) *Attorney, Agent, or Firm* — Miller Canfield

(57) ABSTRACT

A body hanger bracket aligns and attaches an accent panel to a vehicle body panel. The hanger bracket includes selectively detachable first and second alignment tabs. The first alignment tab engages a horizontal indexing feature on the vehicle body panel for aligning the hanger bracket horizontally and the second alignment tab engages a vertical indexing feature on the vehicle body panel for aligning the hanger bracket vertically. After the hanger bracket is aligned and attached to the body panel, the first and second alignment tabs are detached. The accent panel is then attached to the hanger bracket.

7 Claims, 3 Drawing Sheets

BODY HANGER KIT BRACKET

CROSS REFERENCE TO RELATED APPLICATIONS

This application is a divisional application of U.S. patent application Ser. No. 13/205,215, filed on Aug. 8, 2011, which claims the priority to U.S. Provisional Application No. 61/503,863, filed on Jul. 1, 2011. All applications are incorporated herein by reference in their entireties.

BACKGROUND OF THE INVENTION

1. Field of the Invention

The present invention relates to body kit panels or accent panels for automotive vehicles. More particularly, the present invention relates to a body hanger bracket for aligning and attaching a body kit panel or accent panel to an automotive vehicle body panel.

2. Description of Related Art

By way of background, body hanger brackets are commonly used for attaching accent panels; such as front, side, and rear ground effect panels, to the front, side, and rear body panels of a vehicle. Typically, the body hanger bracket includes a pair of fingers for vertically aligning the hanger bracket relative to an upper edge of the vehicle body panel while the hanger bracket is fastened to the vehicle body by rivets, bolts, or the like. The hanger bracket includes an elongated lip spaced laterally from the vehicle body for receiving and supporting an upper edge of the accent panel. The upper edge of the accent panel is supported by the hanger bracket and the lower edge of the accent panel is riveted or bolted to an underside of the vehicle body. Current body hanger brackets, however, do not provide both vertical and horizontal alignment of the hanger bracket along the vehicle body panel for accurate alignment and attachment of the accent panel to the vehicle.

It is desirable, therefore, to provide a body hanger bracket that provides both vertical and horizontal alignment of the hanger bracket along a vehicle body panel for alignment and attachment of an accent panel to a vehicle.

SUMMARY

According to one embodiment of the invention, a body hanger bracket is provided for aligning and attaching an accent panel to a vehicle body panel. The hanger bracket includes selectively detachable first and second alignment tabs. The first alignment tab engages a horizontal indexing feature on the vehicle body panel for aligning the hanger bracket horizontally and the second alignment tab engages a vertical indexing feature on the vehicle body panel for aligning the hanger bracket vertically.

According to another embodiment of the invention, a method of installing a body hanger bracket for an accent panel on a vehicle body panel includes the steps of: locating the body hanger bracket in a horizontal direction by engaging a first alignment tab on the hanger bracket with a horizontal indexing feature on the vehicle body panel; locating the hanger bracket in a vertical direction by engaging a second alignment tab on the hanger bracket with a vertical indexing feature on the vehicle body panel; permanently attaching the hanger bracket to the vehicle body panel; and supporting the accent panel on the hanger bracket.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EMBODIMENTS

Figure 1:
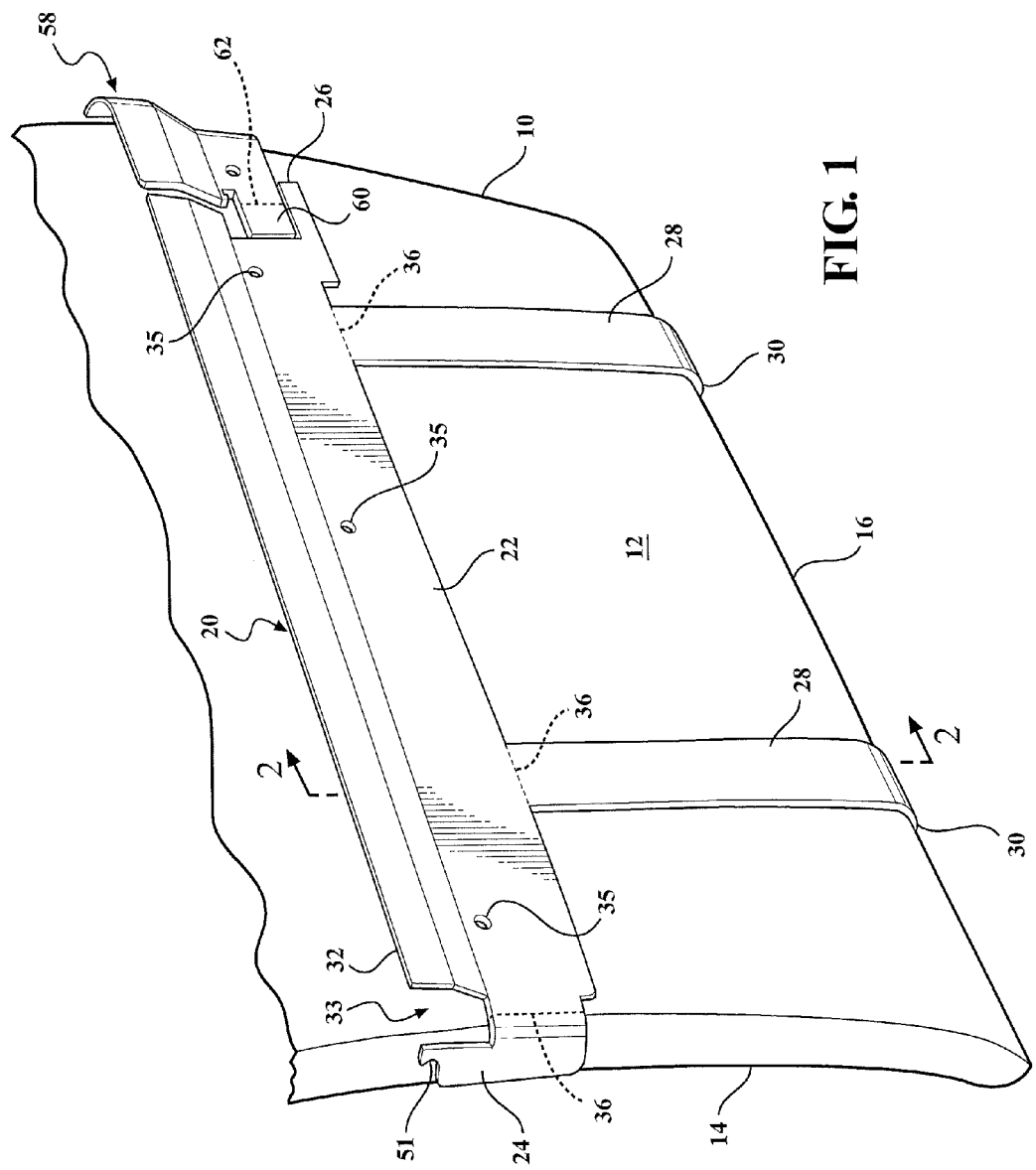
FIG. 1 is a perspective view of a body hanger bracket on a vehicle body panel according to one embodiment of the invention.

Referring to FIG. 1, a vehicle body panel on a vehicle is generally shown at 10 including a front panel 12, a lateral edge 14, and a bottom edge 16. A body hanger bracket, shown at 20, provides for vertical and horizontal alignment and attachment of the hanger bracket 20 along the front panel 12 of the body panel 10 relative to the lateral edge 14 and the bottom edge 16. Specifically, the body hanger bracket 20 includes an elongated support plate 22 extending longitudinally between a first alignment tab 24 and an opposite distal end 26. A plurality of second alignment tabs 28 is spaced apart and extends transversely from the support plate 22 to a hooked distal end 30. An elongated support lip 32 extends upwardly from a top edge of the support plate 22 and is arranged to be spaced laterally from the front panel 12 defining a channel 33 therebetween. The support lip 32 is adapted for supporting an accent panel 40 as is described below in more detail. In the embodiment shown, the second alignment tabs 28 extend downwardly from a bottom edge of the support plate 22, however, it is appreciated that the tabs 28 may extend upwardly from a top edge of the support plate 22 without varying from the scope of the invention.

Figure 2:
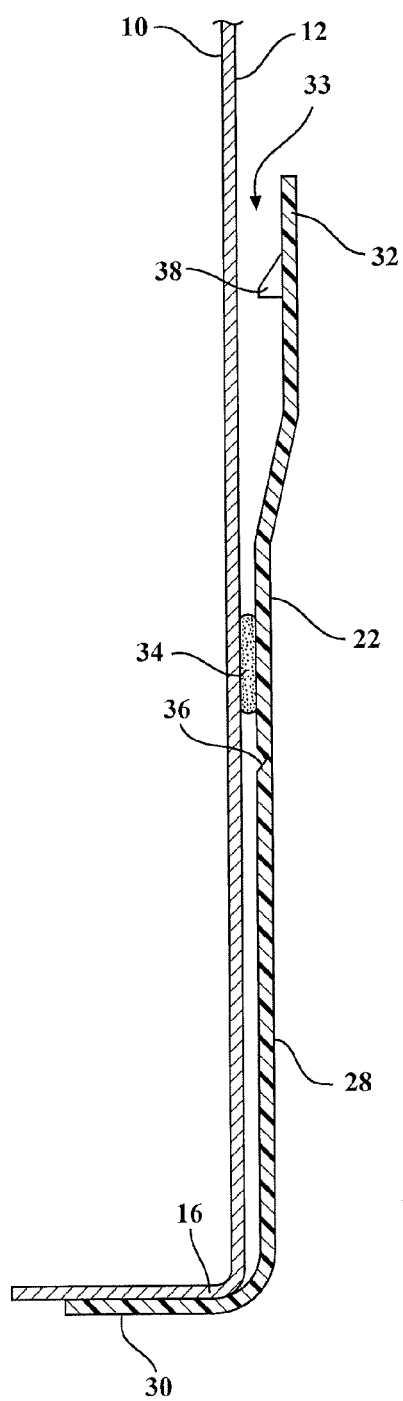
FIG. 2 is a cross-sectional view of the body hanger bracket taken through lines 2-2 in FIG. 1.

The body hanger bracket 20 is aligned along the vehicle body panel 10 by engaging the first alignment tab 24 with the lateral edge 14 and the second alignment tabs 28 with the bottom edge 16. It is appreciated that the first and second alignment tabs 24, 28 may also be aligned with any suitable horizontal and vertical indexing feature on the vehicle body panel 10, such as vehicle body panel joint lines, sill plates, etc., without varying from the scope of the invention. Once the first and second alignment tabs 24, 28 are aligned with the respective lateral and bottom edges 14, 16, the support plate 22 is temporarily secured to the front panel 12 of the body panel 10 by strips of double-sided adhesive tape 34, as shown in FIG. 2. An installer may then drill holes in the body panel 10 through existing holes 35 in the support plate 22. The body hanger bracket 20 is permanently attached to the body panel 10 by securing the support plate 22 to the body panel 10 with rivets, screws, or the like extending through the existing holes 35 into the holes drilled in the body panel 10.

The first alignment tab 24 is attached to the support plate 22 by a V-shaped notched membrane 36 to allow the tab 24 to be removed from the support plate 22 after permanent attachment of the body hanger bracket 20 to the body panel 10. The first alignment tab 24 is removed by bending the tab 24 away from the front panel 12 until the notched membrane 36 breaks. Similarly, the second alignment tabs 28 are attached to the support plate 22 by the V-shaped notched membrane 36 to allow the tabs 28 to be removed from the support plate 22 after permanent attachment of the body hanger bracket 20 to the body panel 10. The second alignment tabs 28 are removed by bending the tabs 28 away from the front panel 12 until the notched membrane 36 breaks. Additional body hanger brackets may be aligned and attached to the body panel 10 along the length of the vehicle depending on the length and contour of the body panel 10 and associated accent panel 40.

Figure 3:
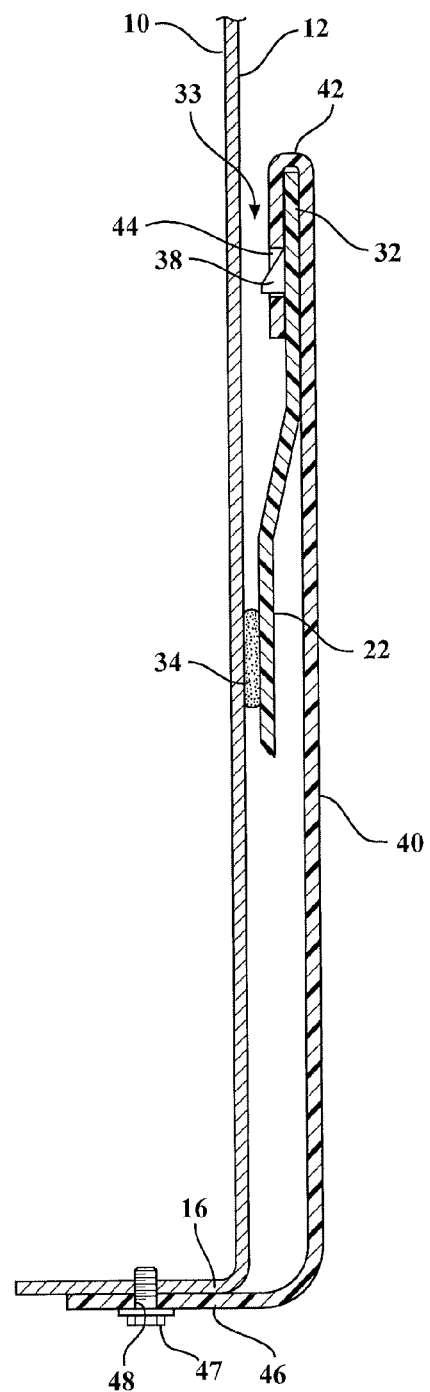
FIG. 3 is a cross-sectional view of the body hanger bracket supporting an accent panel.

After the body hanger bracket 20 is aligned and attached to the body panel 10, and the first and second alignment tabs 24, 28 are removed; the accent panel 40 is aligned and attached to the body panel 10. More specifically, referring to FIG. 3, the accent panel 40 includes an upper hooked portion 42 having longitudinally spaced apart openings 44 in a distal edge thereof. The upper hooked portion 42 is hooked about the support lip 32 on the body hanger bracket 20 to support the accent panel 40. The support lip 32 includes a plurality of longitudinally spaced apart locking tabs 38 received in the respective openings 44 to secure the accent panel 40 to the body hanger bracket 20. An opposite lower portion 46 of the accent panel 40 extends adjacent the bottom edge 16 of the vehicle body panel 10. The accent panel 40 is permanently attached to the bottom edge 16 by securing the lower portion 46 to the bottom edge 16 with rivets, screws, or the like 47 extending through existing holes 48 in the accent panel 40 into holes drilled in the body panel 10. It is appreciated that the body hanger bracket 20 provides a simple and accurate method of aligning and attaching the accent panel 40 on the body panel 10 within specified tolerances and without expensive tooling or fixtures.

Figure 5:
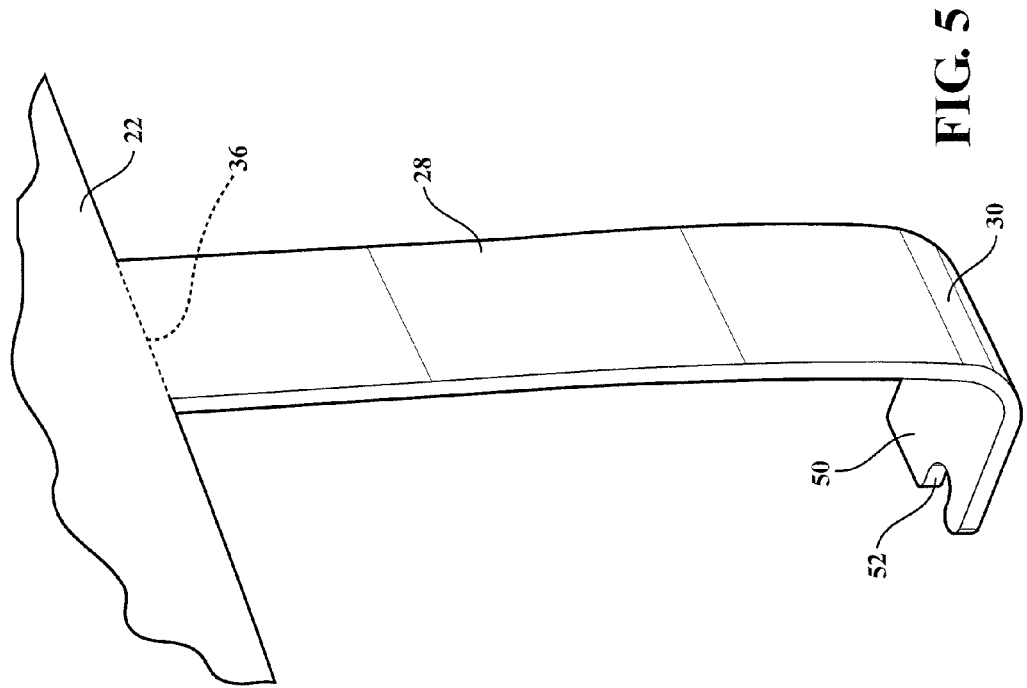
FIG. 5 is a fragmentary perspective view of the body hanger bracket illustrating a second alignment tab of the body hanger bracket.
Figure 4:
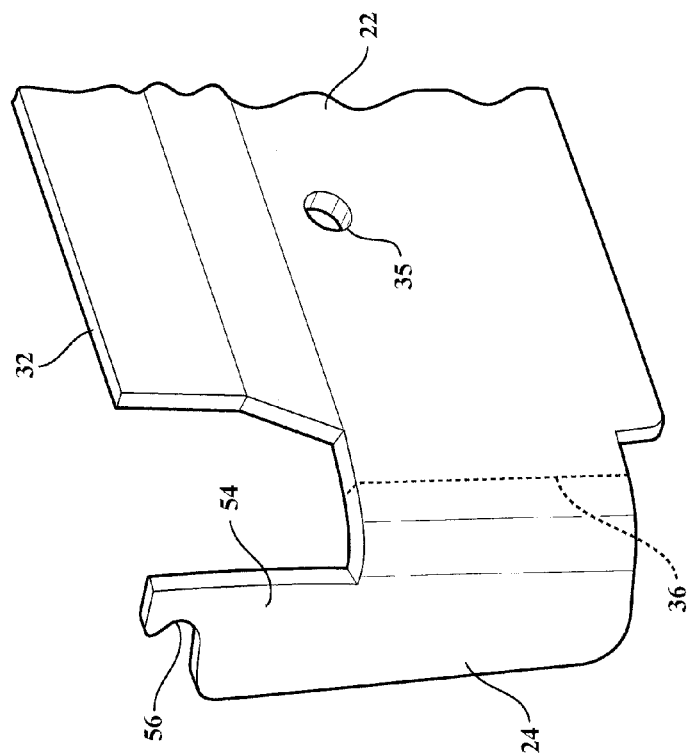
FIG. 4 is a fragmentary perspective view of the body hanger bracket illustrating a first alignment tab of the body hanger bracket.

In another embodiment of the invention, one or more of the second alignment tabs 28 includes a drill-hole template 50 extending from the hooked distal end 30 of the respective tab 28, as shown in FIG. 5. In the embodiment shown, the drill-hole template 50 includes a semi-circular relief 52, which is provided as a location guide for an installer to drill a hole in the bottom edge 16 of the vehicle body panel 10. Thus, when the second alignment tabs 28 are removed and the accent panel 40 is supported on the body hanger bracket 20, the existing hole 48 in the lower portion 46 of the accent panel 40 will align with the hole drilled in the bottom edge 16 of the body panel 10 for receiving the rivet or screw 47 therethrough. Similarly, the first alignment tab 24 may also include a drill-hole template 54 extending from a distal end thereof, as shown in FIG. 4. The drill-hole template 54 includes a semi-circular relief 56, which is provided as a location guide for an installer to drill a hole in the lateral edge 14 of the vehicle body panel 10. Thus, when the first alignment tab 24 is removed and the accent panel 40 is supported on the body hanger bracket 20, an existing hole in the accent panel 40 will align with the hole drilled in the lateral edge 14 of the body panel 10 for receiving a rivet or screw therethrough. It is appreciated that the drill-hole templates 50, 54 may also be a circular hole, slot or other feature that is suitable for use as a location guide without varying from the scope of the invention.

In still another embodiment, a second body hanger bracket, shown at 58 in FIG. 1, is disposed adjacent to the body hanger bracket 20. It is appreciated that one end of the second body hanger bracket 58 may abut directly against the distal end 26 of the body hanger bracket 20 to help locate the second body hanger bracket 58 on the vehicle. Alternatively, the second body hanger bracket 58 may be disposed between the body hanger bracket 20 and a remote body hanger bracket, not shown in the Figures. In this case, the second body hanger bracket 58 is centered between the body hanger bracket 20 and the remote body hanger bracket ensuring an even gap between both. The second body hanger bracket 58 may include a removal tab 60 at one or both ends that can be broken off along a notched membrane 62 if additional space is required to center the second body hanger bracket 58 between the body hanger bracket 20 and the remote body hanger bracket.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A method of installing a body hanger bracket including a first alignment tab and a second alignment tab for an accent panel on a vehicle body panel including a horizontal indexing feature and at least one vertical indexing feature, the method comprising the steps of:
   locating the body hanger bracket in a horizontal direction by engaging the first alignment tab with the horizontal indexing feature;
   locating the body hanger bracket in a vertical direction by engaging the second alignment tab with the at least one vertical indexing feature;
   permanently attaching the body hanger bracket to the vehicle body panel;
   supporting the accent panel on the body hanger bracket; and
   detaching at least one of the first alignment tab and the second alignment tab from the body hanger bracket prior to the step of supporting the accent panel on the body hanger bracket.

2. The method as set forth in claim 1 further including the step of temporarily attaching the body hanger bracket to the vehicle body panel prior to the step of permanently attaching the body hanger bracket to the vehicle body panel.

3. The method as set forth in claim 2 wherein the body hanger bracket is temporarily attached to the vehicle body panel using an adhesive.

4. The method as set forth in claim 1 further including the step of drilling holes in the vehicle body panel through the body hanger bracket prior to the step of permanently attaching the body hanger bracket to the vehicle body panel.

5. The method as set forth in claim 1 further including the step of detaching the first alignment tab and the second alignment tab from the body hanger bracket prior to the step of supporting the accent panel on the body hanger bracket.

6. The method as set forth in claim 1 further including the step of permanently attaching the accent panel to the body hanger bracket.

7. The method as set forth in claim 1 wherein the body hanger bracket includes a locking tab and the accent panel includes an opening, and wherein the step of supporting the accent panel on the body hanger bracket further includes engaging the opening in the accent panel with the locking tab on the body hanger bracket.

* * * * *